(12) United States Patent
Staton et al.

(10) Patent No.: US 11,192,615 B2
(45) Date of Patent: Dec. 7, 2021

(54) SYSTEM FOR DETERMINING LOCATION INFORMATION HAVING A BUOY AND FLOATING HOSE

(71) Applicant: Dunlop Oil & Marine Ltd., Pyewipe (GB)

(72) Inventors: Paul Staton, Pyewipe (GB); Ali Kambiez Zandiyeh, Pyewipe (GB); Simon Bishop, Pyewipe (GB)

(73) Assignee: Dunlop Oil & Marine Ltd., Pyewipe (GB)

( * ) Notice: Subject to any disclaimer, the term of this patent is extended or adjusted under 35 U.S.C. 154(b) by 14 days.

(21) Appl. No.: 17/264,784

(22) PCT Filed: Jun. 13, 2019

(86) PCT No.: PCT/EP2019/065432
§ 371 (c)(1),
(2) Date: Jan. 29, 2021

(87) PCT Pub. No.: WO2020/025206
PCT Pub. Date: Feb. 6, 2020

(65) Prior Publication Data
US 2021/0245842 A1    Aug. 12, 2021

(30) Foreign Application Priority Data

Jul. 31, 2018  (EP) ..................... 18186477
Sep. 18, 2018  (EP) ..................... 18194969

(51) Int. Cl.
*B63B 22/00*     (2006.01)
*B63B 22/02*     (2006.01)
(Continued)

(52) U.S. Cl.
CPC ............ *B63B 22/021* (2013.01); *B63B 27/34* (2013.01); *F16L 1/24* (2013.01); *F16L 11/133* (2013.01)

(58) Field of Classification Search
CPC ....... B63B 22/00; B63B 22/021; B63B 27/34; F16L 1/24; F16L 11/133
See application file for complete search history.

(56) References Cited

U.S. PATENT DOCUMENTS 3,664,286 A    5/1972  Chaney
3,980,038 A    9/1976  Dashew et al.
(Continued)

FOREIGN PATENT DOCUMENTS

WO    2012066031 A1    5/2012

*Primary Examiner* — Stephen P Avila
(74) *Attorney, Agent, or Firm* — Gregory Adams; David L. Cate (57) ABSTRACT

The invention relates to a system (2), having: a buoyant buoy (4), and a floating hose (6) which has a plurality of buoyant hose segments (8) which are coupled in series. The buoy (4) has a liquid outlet connection (12) which is connected to the floating hose (6), so that the floating hose (6) is arranged in a geometrical arrangement with respect to the buoy (4). A plurality of node units (18) are fastened in a distributed manner to the floating hose (6) and the buoy (4). Each node unit (18) is designed to establish, by means of an associated radio unit, a respective radio link (22, 24, 26, 28) to each of at least two of the further radio units of the respective node units (18, 42, 44, 46, 48), so that a radio network (30) is created. Each node unit (18) is designed to determine a relative distance (32, 34, 36, 38) from each further node unit (18) on the basis of the respective radio link.

13 Claims, 5 Drawing Sheets

(51) Int. Cl.
  *B63B 27/34* (2006.01)
  *F16L 1/24* (2006.01)
  *F16L 11/133* (2006.01)

(56) References Cited

U.S. PATENT DOCUMENTS

| | | | |
|---|---|---|---|
| 6,485,343 B1 * | 11/2002 | Borseth | B63H 25/42 |
| | | | 441/4 |
| 6,932,127 B2 * | 8/2005 | Samuelsen | B63B 27/24 |
| | | | 114/230.12 |
| 9,546,540 B2 * | 1/2017 | Taylor | E21B 43/01 |
| 2013/0266381 A1 | 10/2013 | Pettersen | |

* cited by examiner

SYSTEM FOR DETERMINING LOCATION INFORMATION HAVING A BUOY AND FLOATING HOSE

The invention relates to a system.

Systems which have a buoyant buoy and a floating hose are known from the prior art. The floating hose is likewise buoyant. Systems of this kind are often used together with an oil platform or an oil drilling rig. In this case, the conveyed oil is initially conveyed from the drilling rig to the buoy via an underwater hose and from said buoy to a tanker via the floating hose. The tanker can take in the oil. As soon as the holding capacity of the tanker is reached, the floating hose is detached from the tanker again, so that the tanker can travel to a port. The buoyant buoy, together with the floating hose, remains on the sea. However, several hours or even several days may pass until a new tanker is connected to the floating hose. This is the case particularly in very rough seas. In particular, in this case, a free end of the floating hose can be moved around by the water. In an unfavorable case, the free end of the floating hose may even rest on another portion of the floating hose and thereby form a loop. When a new tanker arrives at a system of this kind floating in the sea, the new tanker can usually determine only on site whether the free end of the floating hose is arranged in a manner not crossing over another section of the floating hose and/or the direction in which the free end of the floating hose is arranged with respect to the buoy. Both said items of information are important when the new tanker arrives at said system in order to prevent a collision with the buoy and/or the floating hose and to allow coupling of the free end of the floating hose to the new tanker as quickly as possible. In order to record these items of information, the tanker usually approaches the buoy at low speed, wherein optical viewing means, such as binoculars for example, are used by the crew of the tanker to determine where the floating hose is located and the direction in which the floating hose is oriented with respect to the buoy. On the basis of this information, the following manoeuvre for the tanker is planned, so that the tanker can be coupled to the floating hose. However, in an unfavorable case, several hours may pass before the correct anchor position for the tanker can be selected and/or assumed. This is the case particularly when a free end of the floating hose is arranged in a manner crossing over another section of the floating hose. This is because it is initially necessary to ensure that the floating hose is not arranged in a crossing-over manner before the floating hose is coupled to the tanker. To this end, support vessels which remedy the situation of the floating hose being crossed-over are called up and/or lowered from the tanker. However, higher costs, which are to be avoided, are incurred on account of the associated delay.

The invention is based on the object of providing a system having a buoyant buoy and a floating hose, wherein the system ensures and/or assists simple delay-free and reliable coupling of the floating hose to a tanker.

The object is achieved by a system having the features of claim 1.

Therefore, a system that has a buoyant buoy and a floating hose is provided. The floating hose is preferably a buoyant hose. The system is therefore likewise buoyant. The floating hose has a plurality of buoyant hose segments which are coupled to one another in series. As a result, a common fluid channel can be formed by the floating hose or the plurality of hose segments, which fluid channel is designed to conduct a fluid, such as oil. The buoy has a liquid inlet connection which is designed for an underwater hose to be connected, The buoy also has a fluid outlet connection which is connected to a first end of the floating hose, so that the floating hose is arranged in a geometrical arrangement with respect to the buoy. A plurality of node units are fastened to the floating hose and preferably to the buoy in such a way that the node units are arranged in a manner distributed between the buoy and a second end of the floating hose. Each node unit is designed to establish, by means of an associated radio unit, a respective radio link to each of at least two of the further radio units of the respective node units, so that a radio network, in particular a mesh radio network, is created. In addition, each node unit is designed to determine a relative distance from each further node unit, which is connected via a radio link, on the basis of the respective radio link. At least one of the node units forms a main unit which is designed to collect the relative distances, which are determined by the further node units, via the radio links and/or the radio network. The main unit is designed to determine, on the basis of the collected relative distances, location data which represent the geometrical arrangement of the floating hose relative to the buoy. In addition, the main unit has a radio transmitter unit which is designed to transmit a location signal which represents the location data.

Via the location signal which is provided by the system, the system has the advantage that the geometrical arrangement of the floating hose relative to the buoy can already be inferred before a tanker arrives at the system. Location data which represent the geometrical arrangement of the floating hose relative to the buoy are transmitted by means of the location signal. Therefore, on the basis of this location data, it is possible to determine whether the floating hose is, in principle, in an arrangement which allows simple and reliable coupling of the floating hose to a tanker. This may be the case, for example, when the floating hose is geometrically arranged relative to the buoy without a loop, for example when the floating hose is oriented in a manner pointing away from the buoy without loops and/or without kinked sections. The radio transmitter unit can be designed integrally with or separately from the radio unit of the main unit. The location signal can be transmitted, for example, wirelessly, that is to say by radio. The radio transmitter unit of the main unit can be designed for this purpose. The location signal can be transmitted continuously and/or at discrete intervals and/or periodically. The location signal can be received by a receiver which is on land, is assigned to a satellite or is located on the tanker. Each of said options has the advantage that the geometrical arrangement of the floating hose relative to the buoy can already be inferred clearly before the tanker arrives. If, in an unfavorable case, a loop is formed by the floating hose, measures can be taken in order to remove the loop before the tanker arrives. For example, a smaller ship which is equipped to clear the loop from the floating hose, so that the floating hose is arranged relative to the buoy without loops, can thus travel to the system. This allows simple and reliable coupling of the floating hose to the tanker.

The floating hose is designed as a buoyant hose. The floating hose can also be referred to as a buoyant hose strand. Therefore, both the buoy and the floating hose of the system are buoyant. Therefore, the same also applies to the system as such. Buoyant is preferably understood to be the ability to be able to float in water, in particular in sea water. This can result in the buoy and/or the floating hose each remaining independently arranged above the surface of the water at least in sections. The floating hose has a plurality of buoyant hose segments. Each of the hose segments is designed in the manner of a hose as such and/or a hose section. Each hose segment can have coupling elements at each of the two associated ends, said coupling elements being designed so that a plurality of hose segments can be coupled to one another one behind the other, that is to say in series. The floating hose preferably has a fluid channel which is designed for guiding liquid, such as oil, and is formed jointly by the hose segments. The hose segments are preferably coupled to one another in such a way that the liquid can be guided through the liquid channel without losses.

The liquid inlet connection is preferably arranged on a bottom side of the buoy, so that an underwater hose can be connected to the liquid inlet connection. Said underwater hose is preferably a hose which is designed to guide liquid, in particular oil. The hose is also referred to as an "undersea pipeline". The underwater hose can therefore be designed to provide a fluid connection between the liquid inlet connection of the buoy and a drilling rig or an oil platform. The buoy also has a liquid outlet connection. The liquid outlet connection can have a direct and/or switchable fluid connection to the liquid inlet connection. Said fluid connection can be designed in such a way as to guide liquid from the liquid inlet connection to the liquid outlet connection. If the connection is of switchable design, for example by way of a valve, flow of liquid from the liquid inlet connection to the liquid outlet connection can be controlled, in particular by allowing the valve to be opened or by preventing the valve from being closed.

A geometrical arrangement can be understood to mean, for example, a spatial structure and/or a spatial arrangement. The geometrical arrangement can be determined and/or represented, for example, by the spatial coordinates, for example in a plane, of the floating hose in relation to the buoy. As an alternative or in addition, the geometrical arrangement can be determined and/or represented, for example, by spatial coordinates, preferably in a plane, of the hose segments in relation to the buoy. As an alternative or in addition, the geometrical arrangement can also relate for example to the spatial position and/or the spatial orientation of the floating hose and/or of the hose segments with respect to the buoy. The geometrical arrangement of the floating hose relative to the buoy can therefore provide information about how, where and/or the geometric form in which the floating hose is arranged relative to the buoy. In order to provide the information about the geometrical arrangement of the floating hose relative to the buoy to a receiver, such as a radio signal receiver unit and/or a data processing unit on the tanker or a station on land for example, the main unit is designed to determine, on the basis of collected relative distances, location data which represent the geometrical arrangement of the floating hose relative to the buoy. In this case, the relative distances preferably relate to the distances between the node units and/or to the distances of the main unit from each of the further node units. If the direct distances between the node units along the floating hose are not stored by the main unit, the relative distances between the node units which are likewise as determined can be taken into account when determining the location data. Otherwise, the stored distances between the node units can also be taken into account when determining the location data. The above-mentioned, direct distances mean, in particular, the distance between adjacent nodes units along the floating hose. The relative distances which can be determined by means of the radio links can preferably relate to the relative distances between the main unit and each of the further node units. Using this data, it is possible to geometrically map the geometrical arrangement of the floating hose relative to the buoy.

The node units have radio units for determining the relative distances. Radio links can be established by means of the radio units, so that a radio network, in particular a mesh radio network, is created. Radio signals can be exchanged via the radio links. In this case, the radio signals have a propagation time between the transmission and the subsequent reception. The radio signals can therefore be used to determine the distance between the corresponding radio units. The node units are designed for this purpose. The radio links therefore serve in particular to determine the relative distances between the node units or the associated radio units. The node units are preferably configured such that the determined relative distances are exchanged via the radio links of the radio network. Provision can also be made for each radio unit to be configured in such a way that the relative distances are determined by triangulation on the basis of propagation times of the signals that are exchanged via the radio links. Each of the node units can therefore be designed and/or referred to as an electronic node unit. Each of the node units is fixedly or releasably connected to the system. Therefore, all or at least some of the node units can be fixedly or releasably connected to the floating hose. However, it is also possible for at least one of the node units to be connected to the buoy. Provision can also be made for in each case one of the node units to be connected to precisely one of the hose segments of the floating hose in each case. However, it is also possible for the node units to be arranged in a manner distributed in such a way that each second or each third hose segment is connected to one of the node units. Other distributions of the node units can likewise be provided. For clarification purposes, it should be noted that the floating hose has two ends. Between the ends, the floating hose forms the preferred fluid channel which is preferably designed as a liquid channel. The first end of the floating hose is therefore preferably designed opposite to the second end of the floating hose in the hose direction. The first end of the floating hose is connected to the liquid outlet connection of the buoy. The connection can be designed in such a way that liquid can be conveyed from the liquid outlet connection into the fluid channel of the floating hose. This is expedient particularly when oil is to be conveyed from a drilling rig via an underwater hose, the liquid inlet connection, the liquid outlet connection and the floating hose, to a tanker.

An advantageous refinement of the system is distinguished in that each hose segment is connected at least indirectly to at least one of the node units. Therefore, at least one node unit, which is connected to the respective hose segment, can be provided for each hose segment. Therefore, at least one node unit can be fixedly connected to each of the hose segments and/or can be assigned to the respective hose segment. The connection and/or fastening can be performed at least indirectly. For example, the node units can be fastened between the hose segments, in particular by means of screw connections on the connecting flanges of the hose segments via which two adjoining hose segments are releasably connected to one another. Since at least one node unit is assigned and/or connected to each hose segment, the geometrical arrangement of the floating hose relative to the buoy can be determined in a particularly precise manner via the relative distances.

A further advantageous refinement of the system is distinguished in that each hose segment comprises one of the node units in each case. In this way, each node unit can be fastened precisely to in each case one of the hose segments and/or form on a portion of the respective hose segment. Therefore, each node unit can be assigned to precisely one hose segment. The assignment of a node unit to a hose segment has the advantage that replacement of a hose segment can effect replacement of the node unit at the same time. As a result, repair of a floating hose is particularly easy.

A further advantageous refinement of the system is distinguished in that the node unit of each hose segment is fastened to the lateral outer surface of the respective hose segment. Therefore, the respective node unit can be fastened to the outer surface of the respective hose segment in a force-fitting and/or cohesive manner. In this case, provision is preferably made for the node units to be of watertight design.

A further advantageous refinement of the system is distinguished in that the node unit of each hose segment is embedded into a jacket wall of the respective hose segment. In this way, the respective node unit can be effectively protected against external environmental influences. This is the case particularly when the jacket wall comprises rubber material into which the respective node unit is embedded. The respective node unit can also be protected against water by the rubber material. In other words, the respective node unit can be sealed in a watertight manner by the rubber material. Furthermore, the rubber material provides shock protection. This is because the rubber material can absorb mechanical shocks, this increasing the longevity of the node unit.

A further advantageous refinement of the system is distinguished in that the buoy comprises the main unit, so that the main unit is connected to the buoy. The main unit may require more space and/or a more powerful power supply. This can be ensured by means of the buoy since the buoy often provides more space than each of the hose segments. Furthermore, a battery and/or a solar cell which is designed for supplying electrical power to the main unit can be arranged on the buoy. The arrangement of the main unit on the buoy is therefore advantageous.

A further advantageous refinement of the system is distinguished in that each of the node units has a battery which serves to supply electrical power to the respective node unit. The battery can be designed as a rechargeable battery. Provision can also be made for each of the node units, in particular apart from the main unit, to have no further power supply means. As a result, the node units can be of particularly compact design. Finally, a battery as the power source ensures particularly independent use of the node units.

A further advantageous refinement of the system is distinguished in that the main unit comprises a navigation unit which is designed to receive a satellite-assisted, wireless navigation signal, wherein the navigation unit is configured to determine a geographical buoy location of the buoy on the basis of the navigation signal, and wherein the main unit is configured to supplement the location data in such a way that the location data also represent the geographical buoy location. The geographical location of the buoy can relate to geographical coordination of the buoy. The geographical location of the buoy allows identification of the absolute, and not only relative, geographical positions of the buoy and therefore of the system. The navigation signal can be sent by a plurality of satellites, so that the navigation unit determines the geographical buoy location by triangulation and/or on the basis of the propagation times of the navigation signals. The navigation unit is preferably designed for this purpose. Since the location data can represent the geometrical arrangement of the floating hose relative to the buoy and the geographical buoy location, the location data allow precise information about the location of the buoy and the arrangement of the floating hose relative to the buoy to be provided.

Corresponding location data can be represented by the location signal that can be sent wirelessly by means of the transmitter unit of the main unit.

An advantageous refinement of the system is distinguished in that one of the hose segments comprises the main unit, so that the main unit is connected to this hose segment which is referred to as the main hose segment. With respect to the advantageous explanations, preferred features, advantages and/or effects as have been explained in connection with the main unit, reference is analogously made to the above discussions about the main unit for the abovementioned hose segment.

A further advantageous refinement of the system is distinguished in that one of the node units, which is connected at least indirectly to one of the hose segments, in particular the main hose segment, comprises a further navigation unit which is designed to receive a further satellite-assisted, wireless navigation signal, wherein the further navigation unit is configured to determine a geographical hose location of the respective hose segment on the basis of the further navigation signal, wherein the radio units are configured to exchange the geographical hose location by means of the radio links and/or the radio network, and wherein the main unit is configured to add to the location data, so that the location data also represent the geographical hose location. The location data can therefore represent, for example, the geographical arrangement of the floating hose relative to the buoy, the geographical buoy location and the geographical hose location. In this case, the location data provide particularly precise information about where and how the buoy and the floating hose are arranged. Provision can be made for the node unit of each hose segment to be designed in such a way as is provided for the above, explained exemplary embodiment of the hose segment.

A further advantageous refinement of the system is distinguished in that the radio transmitter unit is designed to wirelessly transmit the location signal to a satellite receiver and/or to a receiver installed at a fixed location on land. As an alternative or in addition, the radio transmitter unit can be designed to wirelessly transmit the location signal to a receiver on a ship, in particular a tanker. Therefore, the arrangement of the floating hose relative to the buoy and the geographical position of the system can be remotely monitored.

An advantageous refinement of the system is distinguished in that each hose segment has a length of at least 7.5 meters or at least 10 meters. The same can apply to the node units which are arranged in a distributed manner between the buoy and the second end of the floating hose. Therefore, the node units which are arranged one behind the other in series can each be at least at a distance of 7 meters or 9.5 meters from one another. The distances of the node units can also correspond to the lengths of the hose segments. Therefore, the distances between the node units which are arranged in series can be, for example, at least 7.5 meters or at least 10 meters. The distances between nodes units which are arranged immediately one behind the other along the floating hose from the buoy to the second end of the floating hose can be stored by the main unit. In this case, it is not necessary for said distances to be recorded as relative distances by means of the radio links.

An advantageous refinement of the system is distinguished in that each node unit is designed to send and receive reference signals via the radio links, and wherein each node unit is designed to determine the relative distances with an accuracy of at least 85%, preferably at least 95%, on the basis of the reference signals. If the reference signal is sent, for example, from one node unit to another node unit which is 20 meters away, provision is particularly preferably made for the distance between the two node units to be determined with a deviation of at most 3 meters, preferably at most 1 meter. The accuracy is particularly preferably 97%. In this case, the maximum deviation is 0.6 meter.

A further advantageous refinement of the system is distinguished in that the node units are designed to update the determined relative distances at predetermined time intervals, wherein the main unit is configured to update the location data on the basis of the updated relative distances, and wherein the radio transmitter unit is configured to send the location signal with updated location data after each update of the location data. For example, provision can therefore be made for the relative distances to be updated, for example, every 30 minutes. The location data are then updated, this in turn leading to the location signal which represents the updated location data being transmitted. As a result, the arrangement of the floating hose relative to the buoy can be continuously monitored.

Further features, advantages and possible applications of the present invention emerge from the following description of the exemplary embodiments and the figures. Here, all of the features described and/or illustrated in the figures form the subject matter of the invention individually and in any desired combination, even independently of the composition thereof in the individual claims, or the back-references thereof. In the figures, it is furthermore the case that the same reference designations are used for identical or similar objects.

Figure 1:
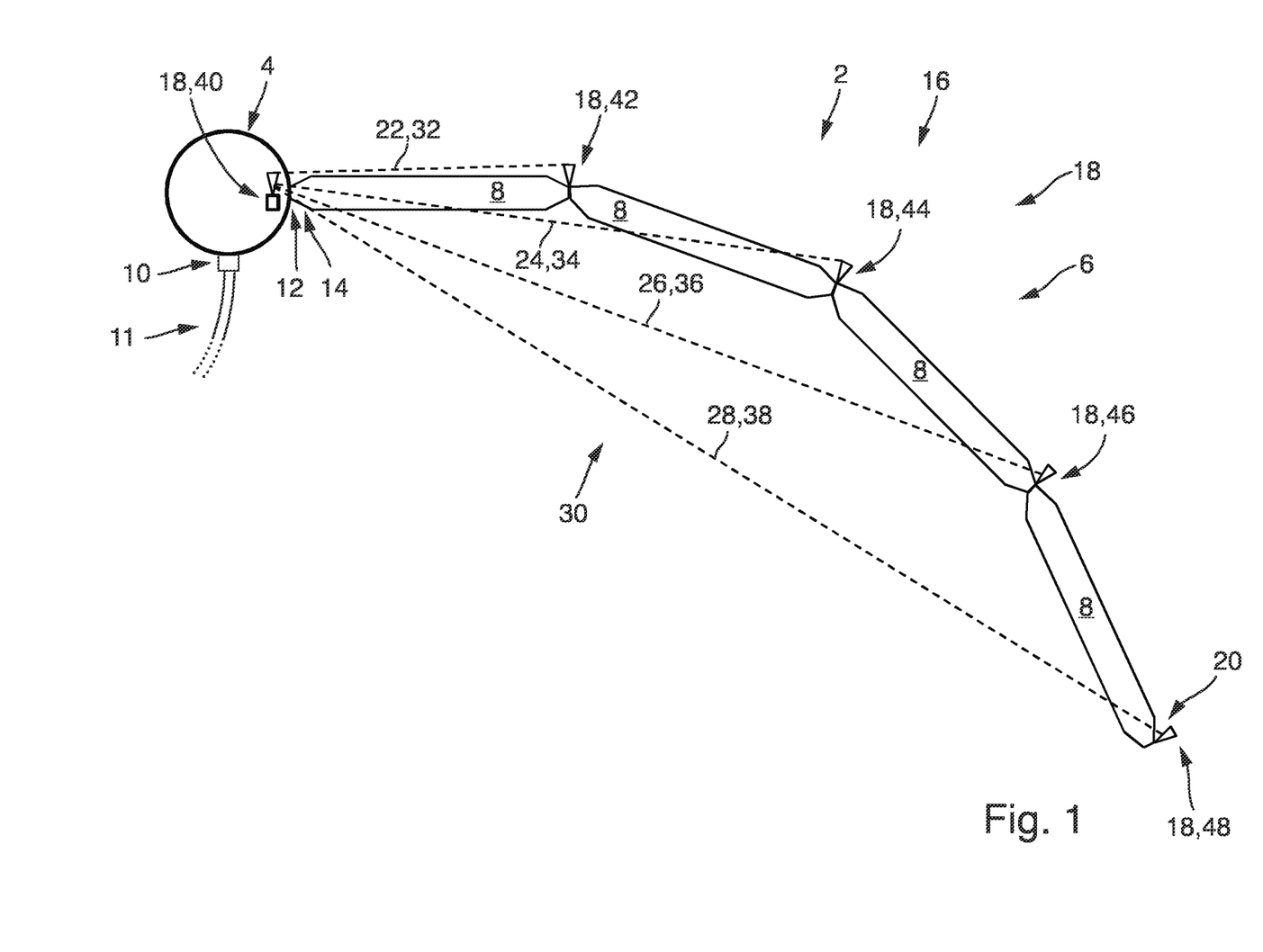
FIG. 1 shows a schematic view of an advantageous refinement of the system.

FIG. 1 illustrates the system 2 having a buoyant buoy 4 and a buoyant floating hose 6. In this case, the floating hose 6 is formed by a plurality of buoyant hose segments 8. The hose segments 8 are connected to one another one behind the other in series in such a way that the floating hose 6 with a continuous, common liquid channel which extends from a first end 14 of the hose 6 to a second end 20 of the hose 6 is formed by the hose segments 8. By way of the first end 14, the floating hose 6 is coupled to a liquid outlet connection 12 of the buoy 4 in such a way that liquid can flow out of the liquid outlet connection 12 into the liquid channel of the floating hose 6.

The system 2 is used in order to float on the sea. Therefore, the system 2 is a buoyant system. It can float on water. The same applies to each hose segment 8 or to the floating hose 6 and to the buoy 4. The buoy 4 can be connected to an underwater hose 11, which is schematically illustrated only in sections in FIG. 1, by means of a liquid inlet connection 10. Liquid, in particular crude oil, can be conveyed from a drilling rig to the buoy or to the associated liquid inlet connection 10 via the underwater hose 11. The liquid inlet connection 10 is connected directly or in a switchable manner to the liquid outlet connection 12. Oil which flows via the underwater hose to the liquid inlet connection 10 of the buoy 4 can then be conveyed via the liquid outlet connection 12 and the floating hose 6 which is coupled to it. The second end 20 of the floating hose 6 can be coupled to a floating tanker (that is to say a ship which is configured as a tanker) into which the oil can flow. However, the floating tanker is not permanently coupled to the second end 20 of the floating hose 6. As soon as the tanks of the floating tanker are full, the second end 20 of the floating hose 6 is uncoupled from the floating tanker, so that the floating tanker can travel to a port. During this time, the floating hose 6 with the free, second end 20 floats on the sea. In stormy weather and given correspondingly high swells, the floating hose 6 may overlap in a loop. Renewed coupling of the floating tanker to the second end 20 of the floating hose is then made more difficult, if not impossible. In order to be informed about whether the floating hose 6 can be coupled to the floating tanker without problems already before the floating tanker arrives, provision is made for the system 2 to have a plurality of node units 18.

The plurality of node units 18 are fastened to the floating hose 6 and preferably to the buoy 4 in such a way that the node units 18 are arranged so as to be distributed between the buoy 4 and the second end 20 of the floating hose 6. For example, provision can thus be made for one node unit 18, which is referred to as the main unit 40, to be fastened to the buoy 4. A further node unit 18 can be referred to as the first node unit 42 which is fastened to ends of the first hose segment 8 that are averted from the buoy 4. The same can apply to each of the further hose segments 8. Therefore, a second node unit 44 can be provided for the second hose segment 8, a third node unit 46 can be provided for the third hose segment 8, and a fourth node unit 48 can be provided for the fourth hose segment 8. The node units 42, 44, 46, 48 which are associated with the hose segments 8 can be fixedly fastened to the respective hose segment 8.

Each of the node units 18 is designed to establish, by means of an associated radio unit, a respective radio link 22, 24, 26, 28 to each of at least two of the further radio units of the respective node units 42, 44, 46, 48, so that a radio network 30, in particular a mesh radio network, is created therefrom. By way of example, this is illustrated in FIG. 1 on the basis of the node unit 18 which is referred to as the main unit 40. The radio unit of the main unit 40 can establish a first radio link 22 to the radio unit of the first node unit 42. The same applies to the second radio link 24 to the second node unit 44, the third radio link 26 to the third node unit 46, and the fourth radio link 28 to the fourth node unit 48. Signals, in particular reference signals, can be exchanged by means of the radio links 22, 24, 26, 28. The relative distances between the node units 18 can be determined on the basis of the exchanged signals. Therefore, provision is made for each node unit 18, 40, 42, 44, 46, 48 to be designed to determine a relative distance 32, 34, 36, 38 from each further node unit 42, 44, 46, 48, which is connected via a radio link 22, 24, 26, 28, on the basis of the respective radio link 22, 24, 26, 28. This is intended to be explained purely by way of example on the basis of the radio links 22, 24, 26, 28 which are illustrated in FIG. 1.

The first radio link 22 between the main unit 40 and the first node unit 42 can be used, for example, in order to determine the first relative distance between the main unit 40 and the first node unit 42. The same can be provided for the second radio link 24, the third radio link 26 and the fourth radio link 28, so that the corresponding relative distance, specifically the second relative distance 34, the third relative distance 36 and, respectively, the fourth relative distance 38, can be determined therefrom in each case. Since each of the node units 18 can establish corresponding radio links via the associated radio units, a large number of radio links which allow the corresponding distances, which are then referred to as relative distances, to be determined are created as a result. These relative distances are suitable for determining the geometrical arrangement 16 of the floating hose 6 relative to the buoy 4. Therefore, provision is made for at least one of the node units 18 to be designed as the main unit 40. This is formed in FIG. 1 by way of example by the node unit 18 which is fastened to the buoy 4. This main unit 40 is also designed to collect the relative distances, which are determined by the further node units 42, 44, 46, 48, via the radio links 22, 24, 26, 28 and/or the radio network 30. In addition, the main unit 40 is designed to deli) termine, on the basis of the collected relative distances 32, 34, 36, 38, location data which represent the geometrical arrangement 16 of the floating hose 6 relative to the buoy 4. With this location data, it is therefore possible to make a statement about whether the floating hose 6 has, for example, a loop or another shape which prevents a floating tanker from being able to easily and reliably couple to the second end 20 of the floating hose 6, or whether the arrangement 16 of the floating hose 6 allows the floating tanker to be able to be easily and reliably coupled to the second end 20. Therefore, provision is made for the main unit 40 to have a radio transmitter unit 50 which is designed to wirelessly transmit a location signal that represents the location data. In this context, reference is made to FIG. 2 in which the system 2 is once again schematically illustrated, although identification of the exemplary radio links and the relative distances has been dispensed with here.

Figure 2:
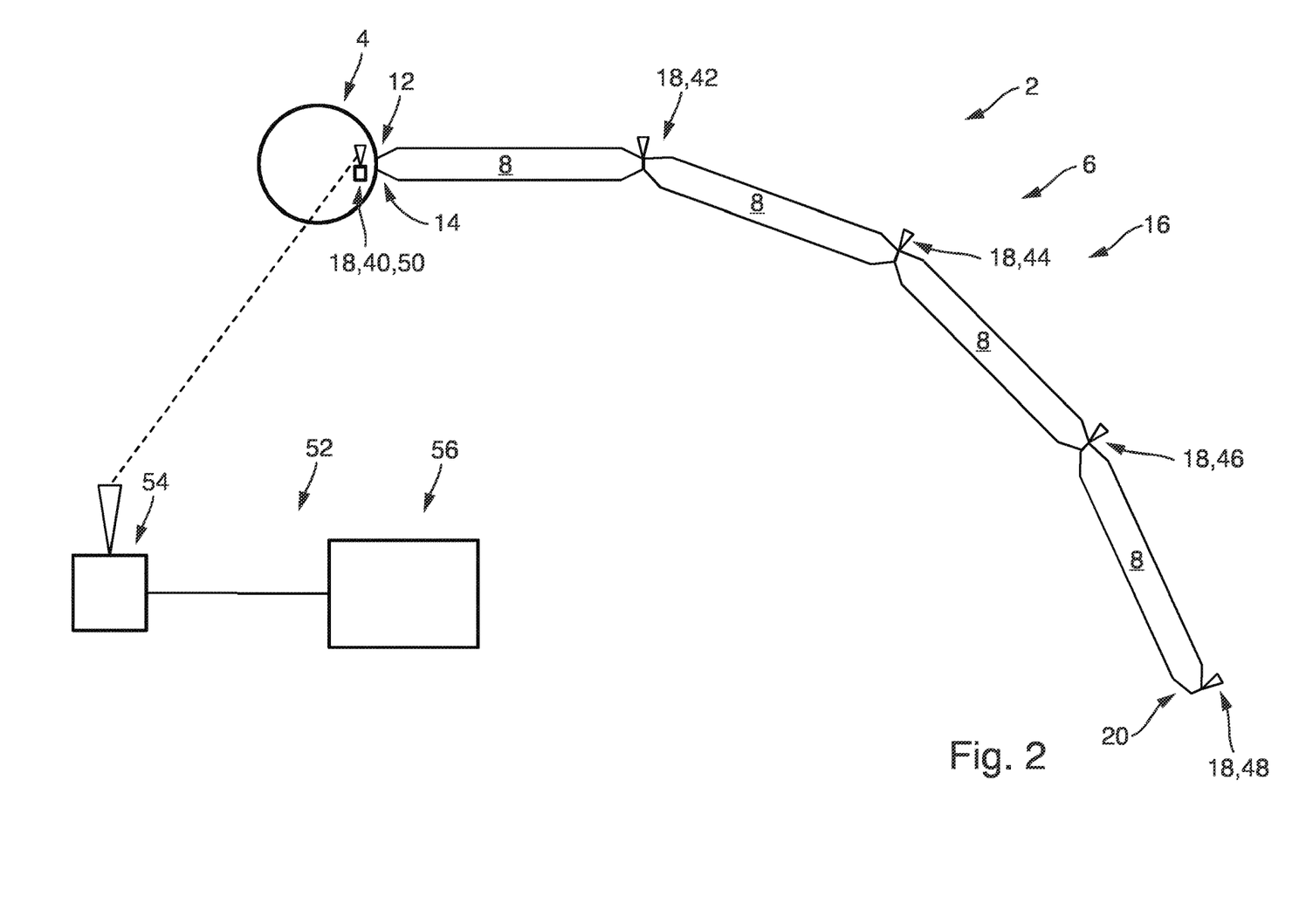
FIG. 2 shows a schematic view of a further advantageous refinement of the system.

FIG. 2 illustrates a base station 52 which is fixed on land and has a radio receiver 54 which is designed to receive the location signal which is transmitted by the radio transmitter unit 50. The receiving unit 54 can be coupled to a computer unit 56 of the base station 52, so that the location data which is represented by the received location signal can be transmitted to the computer unit 56 by the radio receiver 54. The computer unit 56 can be designed to evaluate the location data. In particular, the computer unit 56 can be configured in such a way as to determine the arrangement of the floating hose 6 relative to the buoy 4 on the basis of the location data. It was explained above that the base station 52 is arranged on land. However, this is not absolutely necessary. Therefore, the location signal can be transmitted by means of the radio transmitter unit 50 to a satellite which in turn sends the location signal or a signal which is dependent on it to the radio receiver 54 via further signal transmission stations. The radio receiver 54 can also be designed as a wired receiver (and also referred to as such) if it is coupled directly to a network which can establish a signal connection to a satellite. As an alternative or in addition, the base station 52 can also be installed on a ship, in particular on a floating tanker. The information about the arrangement of the floating hose 6 is then already available on the floating tanker before it arrives at the system 2.

The radio units of the node units 18 can be designed to establish radio links 22, 24, 26, 28 over a range of between 1 meter and 1000 meters. In contrast, for the radio transmitter unit 50, provision is preferably made for the radio transmitter unit to be able to in this way send the location signal to a radio receiver 54 which is arranged over 3000 meters away. Therefore, the radio transmitter unit 50 can be designed, for example, to transmit the location signal with a range of at least 10 kilometers.

Figure 3:
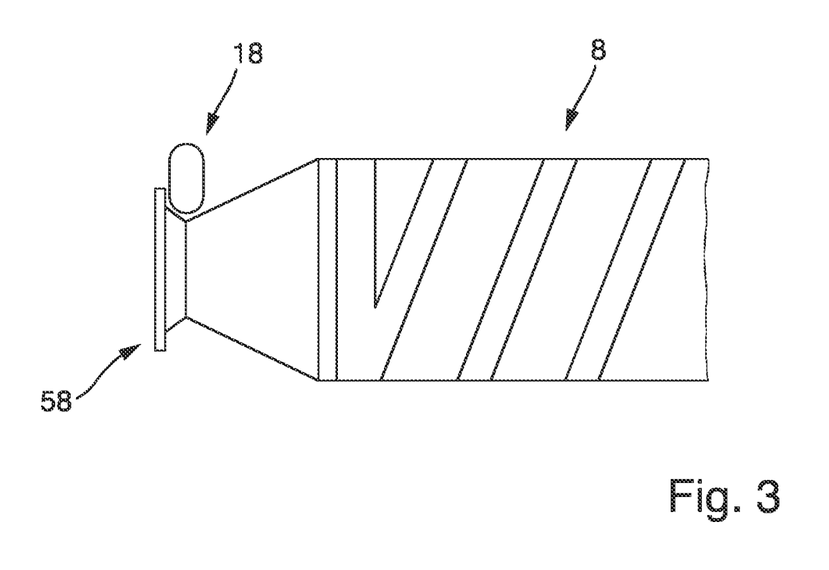
FIG. 3 shows a schematic side view of an advantageous refinement of an end section of a hose segment.

As can be seen schematically by looking at FIGS. 1 and 2 together, the hose segments 8 are connected to one another at the end sides in such a way that they form the floating hose 6. In this case, each of the hose segments 8 can have a respective connection flange 58 at opposite end sections. Each connection flange 58 is designed for releasable connection to a further connection flange 58, in particular of a further hose segment 8. FIG. 3 schematically illustrates an end section of a hose segment 8. The connection flange 58 can also be schematically seen in said figure. The following explanations can apply in an analogous manner to each hose segment 8.

As can be schematically seen in FIG. 3, provision is preferably made for a node unit 18 which is assigned to the hose segment 8 to be arranged on the connection flange 58 and/or fastened there. Therefore, the corresponding node unit 18 can be fastened to the connection flange 58 by way of a screw connection. The screws which connect the connection flange 58 to an opposite connection flange 58 of a further hose segment 8 can be used for this purpose. In this case, provision is preferably made for each node unit 18 to be of watertight design. This is in particular particularly advantageous when used at sea since not only the hose segments 8 but also the node units 18 are exposed to the sea water. In addition, provision is preferably made for each of the node units 18 to have a power source, such as a battery, in particular a rechargeable battery, for example. The capacitance of the battery is preferably selected in such a way that the node unit 18 can be operated for at least 18 months without replacing the battery.

Figure 4:
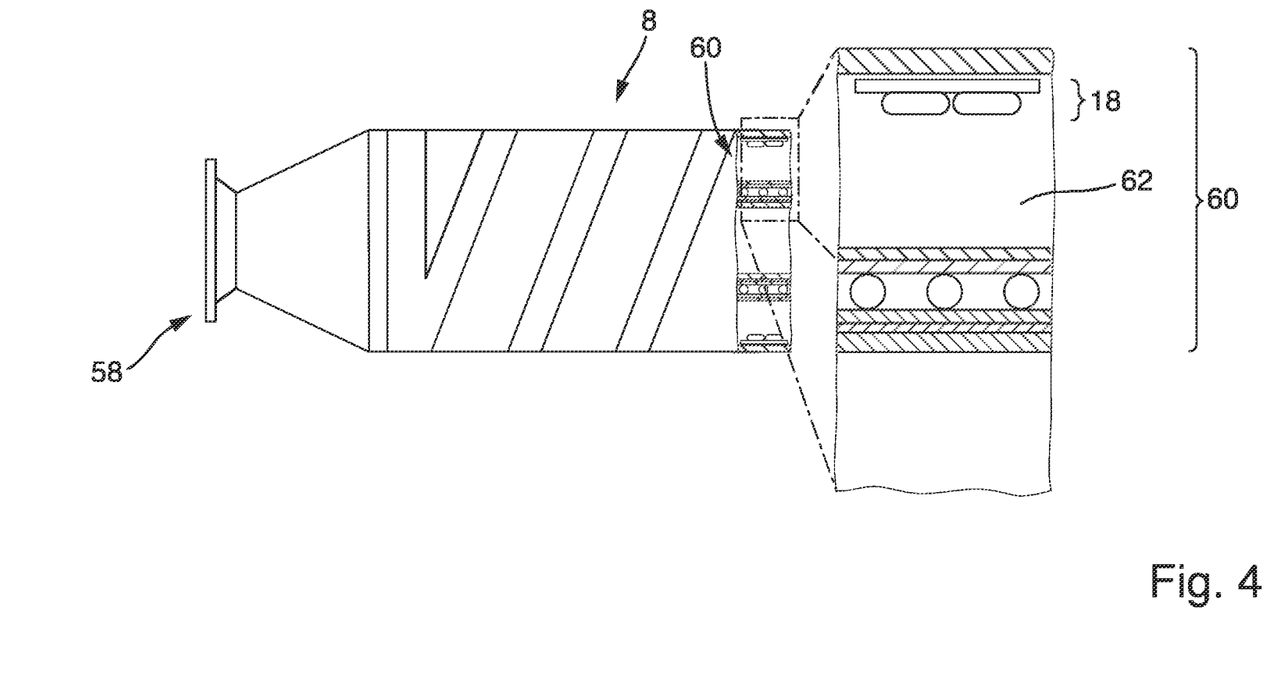
FIG. 4 shows a schematic side view of a further advantageous refinement of an end section of a hose segment and an enlarged illustration of a detail of the end section.

In order to better protect the node unit 18 against mechanical shocks and/or against the sea water, provision can be made for the node unit 18 which is assigned to the hose segment 8 to be embedded into the outer jacket wall 60 of the respective hose segment 8. This is schematically illustrated in FIG. 4 by way of example. FIG. 4 schematically illustrates an enlarged portion of the jacket wall 60 on the right-hand side. The outer portion of the jacket wall 60 often comprises rubber material 62 into which the respective node unit 18 can be embedded. Embedding a node unit 18 into the rubber material 62 of a hose segment 8 has the advantage that the respective node unit 18 can be particularly easily and reliably protected against sea water but also against mechanical shocks. This increases the service life of the node unit 18. However, when the node unit 18 is embedded into the rubber material 62, provision is preferably made for a capacitance of the battery of the node unit 18 to be configured in such a way that the node unit 18 can be operated for several years, in particular at least for over 5 years, without replacing the battery.

Figure 5:
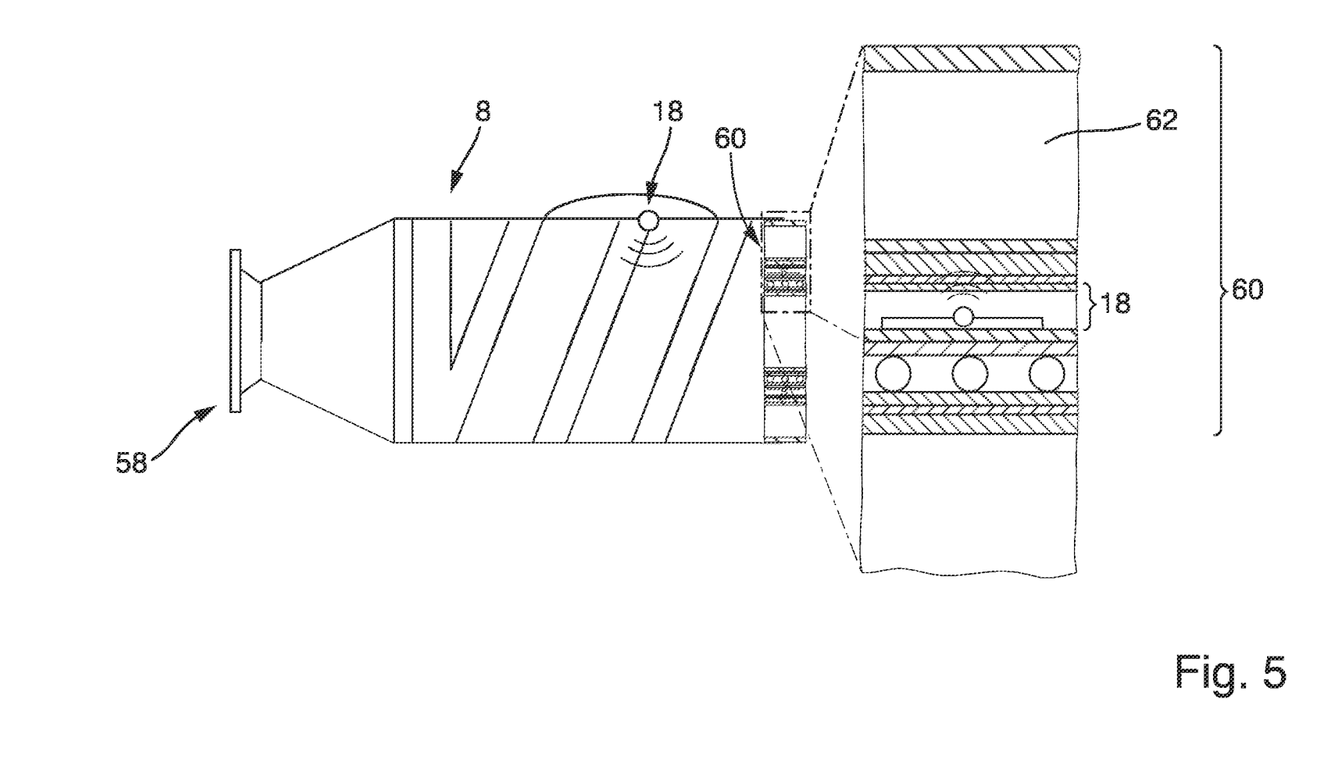
FIG. 5 shows a schematic side view of a further advantageous refinement of an end section of a hose segment and an enlarged illustration of a detail of the jacket wall of the end section.

As can be seen in FIG. 5 of the end section of the hose segment 8, the jacket wall 60 can be formed by a plurality of layers which are arranged one on top of the other in the radial direction. The node unit 18 of a hose segment 8 can therefore also be arranged in a further inner layer of the jacket wall 6, so that a further improved protective effect against sea water and/or mechanical shocks can be ensured.

Referring once again to FIGS. 1 and/or 2, it should also be noted that the main unit 40 can have a navigation unit which is formed for receiving a navigation signal. In addition, the navigation unit can be designed to determine a location, in this case to determine the buoy location of the buoy 4. Therefore, yet further information which goes beyond the arrangement of the floating hose 6 can be added to the location data by means of the navigation unit and the received navigation signal. Here, provision is preferably made for the main unit 40 to be configured to supplement the location data in such a way that the location data also represent the geographical buoy location If these location data are then sent by the radio transmitter unit 50 of the main unit 40 by means of the location signal, said data can be received, for example, by the floating tanker that is on the way to the system 2. Therefore, on the basis of the received location signal, it is possible to evaluate whether the arrangement of the floating hose 6 relative to the buoy 4 is configured in such a way that coupling of the floating tanker to the second end 20 of the floating hose 6 in a successful manner is possible. Furthermore, on the basis of the geographical buoy location of the buoy 4 and furthermore the geometrical arrangement of the floating hose 6 relative to the buoy 4, it is possible to determine how the floating tanker is arriving at the system 2 in order to effectively prevent collision with the floating hose 6.

In addition, it should be noted that "having" does not exclude any other elements or steps and "a" or "an" does not exclude a plurality. In addition, it should be noted that features which have been described with reference to one of the above exemplary embodiments can also be used in combination with other features of other exemplary embodiments described above. Reference signs in the claims are not to be considered to be limiting.

LIST OF REFERENCE SIGNS (PART OF THE DESCRIPTION)

2 System
4 Buoy
6 Floating hose
8 Hose segment
10 Liquid inlet connection
11 Underwater hose
12 Liquid outlet connection
14 First end
16 Arrangement
18 Node unit
20 Second end
22 First radio link
24 Second radio link
26 Third radio link
28 Fourth radio link
30 Radio network
32 First relative distance
34 Second relative distance
36 Third relative distance
38 Fourth relative distance
40 Main unit
42 First node unit
44 Second node unit
46 Third node unit
48 Fourth node unit
50 Radio transmitter unit
52 Base station
54 Radio receiver
56 Computer unit
58 Connection flange
60 Jacket wall
62 Rubber material

The invention claimed is:

1. A system for determining location information, the system comprising:
   a buoyant buoy comprising a liquid inlet connection which is designed for an underwater hose to be connected, and a fluid outlet connection connected to a first end of the floating hose so that a floating hose is arranged in a geometrical arrangement with respect to the buoy;
   the floating hose comprising a plurality of buoyant hose segments coupled to one another in series;
   a plurality of node units fastened to the floating hose and to the buoy, the plurality of node units arranged in a manner distributed between the buoy and a second end of the floating hose;
   each node unit is designed to establish by an associated radio unit a respective radio link to each of at least two of the further radio units of the respective node units and create a mesh radio network;
   each node unit is designed to determine a relative distance from each further node unit, connect via a radio link on the basis of the respective radio link;
   at least one of the node units forms a main unit designed to collect the relative distances, which are determined by the further node units, via the radio links and/or the radio network;
   the main unit is designed to determine, on the basis of the collected relative distances, location data which represent the geometrical arrangement of the floating hose, and
   the main unit comprises a radio transmitter unit designed to wirelessly transmit a location signal which represents the location data.

2. The system of claim 1, each hose segment is connected at least one of the node units.

3. The system of claim 1, each hose segment comprises one of the plurality of node units.

4. The system of claim 1, each hose segment is fastened to the lateral outer surface of the respective hose segment.

5. The system of claim 1, the node unit of each hose segment is embedded into a jacket wall of the respective hose segment.

6. The system of claim 1, the buoy comprises the main unit.

7. The system of claim 1, the main unit comprises a navigation unit designed to receive a satellite-assisted, wireless navigation signal, the navigation unit is configured to determine a geographical buoy location of the buoy on the basis of the navigation signal, and the main unit is configured to supplement the location data in such a way that the location data also represent the geographical buoy location.

8. The system of claim 1, one of the hose segments comprises the main unit, so that the main unit is connected to this hose segment which is referred to as the main hose segment.

9. The system of claim 1, one of the node units is connected at least one of the hose segments and comprises a further navigation unit which is designed to receive a further satellite-assisted, wireless navigation signal, wherein the further navigation unit is configured to determine a geographical hose location of the respective hose segment on the basis of the further navigation signal, wherein the radio units are configured to exchange the geographical hose location by means of the radio links and/or the radio network, and wherein the main unit is configured to add to the location data, so that the location data also represent the geographical hose location.

10. The system of claim 1, the radio transmitter unit is designed to wirelessly transmit the location signal to a satellite receiver and a receiver installed at a fixed location on land.

11. The system of claim 1 each hose segment has a length of at least 7.5 meters.

12. The system of claim 1, each node unit is designed to send and receive reference signals via the radio links and wherein each node unit is designed to determine the relative distances with an accuracy of at least 85% on the basis of the reference signals.

13. The system of claim 1, the node units are designed to update the determined relative distances at predetermined time intervals, the main unit is configured to update the location data on the basis of the updated relative distances, and wherein the radio transmitter unit is configured to send the location signal with updated location data after each update of the location data.

\* \* \* \* \*